US006616753B2

(12) United States Patent
Reddy et al.

(10) Patent No.: US 6,616,753 B2
(45) Date of Patent: Sep. 9, 2003

(54) METHODS AND COMPOSITIONS FOR SEALING SUBTERRANEAN ZONES

(75) Inventors: B. Raghava Reddy, Duncan, OK (US); Karen Luke, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/013,974

(22) Filed: Dec. 11, 2001

(65) Prior Publication Data

US 2003/0121661 A1 Jul. 3, 2003

(51) Int. Cl.[7] .................... C04B 22/14; E21B 33/14
(52) U.S. Cl. .................. 106/718; 106/705; 106/706; 106/724; 106/725; 106/727; 106/772; 106/773; 106/774; 106/787; 106/789; 106/790; 106/802; 106/803; 106/808; 106/809; 106/815; 166/293; 405/267
(58) Field of Search .................. 166/293; 106/692, 106/694, 705, 706, 718, 724, 725, 727, 772, 773, 774, 787, 789, 790, 802, 803, 808, 809, 815; 405/267

(56) References Cited

U.S. PATENT DOCUMENTS

| 931,884 A | 8/1909 | McCormick | 106/662 |
|---|---|---|---|
| 3,359,225 A | 12/1967 | Weisend | 260/29.6 |
| 3,425,892 A | 2/1969 | Edelson et al. | 106/89 |
| 3,620,785 A * | 11/1971 | Root et al. | 106/692 |
| 3,734,188 A * | 5/1973 | Root et al. | 166/292 |
| 3,847,635 A | 11/1974 | Lange et al. | 106/110 |
| 3,959,003 A | 5/1976 | Ostroot et al. | 106/93 |
| 4,415,367 A | 11/1983 | Nelson | 106/89 |
| 4,582,139 A | 4/1986 | Childs et al. | 166/293 |
| 4,762,561 A * | 8/1988 | Holub et al. | 106/695 |
| 4,822,421 A | 4/1989 | Crabb | 106/89 |
| 5,660,625 A | 8/1997 | Helmboldt et al. | 106/736 |
| 6,273,191 B1 | 8/2001 | Reddy et al. | 166/293 |
| 6,352,585 B1 * | 3/2002 | Diesso | 106/35 |

FOREIGN PATENT DOCUMENTS

| GB | 2 353 523 A | 2/2001 | C04B/28/02 |
|---|---|---|---|
| JP | 50-22021 | * 3/1975 | |
| JP | 54-143437 | * 11/1979 | |
| JP | 57-27955 | * 2/1982 | |
| JP | 11-157906 | * 6/1999 | |

OTHER PUBLICATIONS

Derwent Abstract No. 1982–83088E, abstract of Soviet Union Patent Specification No. 883338 (Nov. 1981).*
Abstract No. XP002235210 entitled "Cement Retarder" dated Jan. 18, 1995 (abstract of Chinese Patent Specification No. 1097402).

* cited by examiner

Primary Examiner—Anthony J. Green
(74) Attorney, Agent, or Firm—Craig W. Roddy; C. Clark Dougherty, Jr.

(57) ABSTRACT

Methods and compositions for sealing subterranean zones penetrated by well bores are provided. The methods basically comprise the steps of introducing a sealing composition into the subterranean zone comprised of a hydraulic cement, sufficient water to form a slurry and a rapidly acting thixotropy providing gelling agent, and allowing the sealing composition to remain at rest in the zone whereby the sealing composition rapidly gels and then sets into a hard impermeable mass therein.

26 Claims, No Drawings

US 6,616,753 B2

METHODS AND COMPOSITIONS FOR SEALING SUBTERRANEAN ZONES

BACKGROUND OF THE INVENTION

1. Field of the Invention.

The present invention relates to improved methods and compositions for sealing subterranean zones to prevent the uncontrolled flow of fluids into or from the zones.

2. Description of the Prior Art.

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, highly permeable zones are often encountered whereby the drilling fluid circulation is lost and drilling operations must be terminated while remedial steps are taken. Also, when a subterranean zone is penetrated containing fluids under pressure which exceeds the hydrostatic pressure exerted on the zone by the drilling fluid, formation fluid cross-flows and/or underground blow-outs can and often do occur.

Heretofore, a variety of sealing compositions have been developed and used for combating lost circulation, cross-flow and underground blow-out problems. However, such compositions have often been unsuccessful due to delayed and inadequate viscosity development by the compositions. For example, a variety of cement compositions have been used in attempts to stop lost circulation. The lost circulation is usually the result of encountering weak permeable subterranean zones that contain natural fractures or are fractured by drilling fluid pressures and rapidly break down. When a conventional cement or other slow setting composition is squeezed into the zone, the delay in developing high viscosity allows the composition to be diluted and displaced deeply into the zone whereby it bypasses the highly permeable fractures, vugs and the like causing the lost circulation. The same type of problem often occurs when cross-linked hydrated gels and other similar plugging compositions are utilized.

Thus, there are needs for improved methods and sealing compositions for sealing subterranean zones that develop high viscosity in a few seconds or minutes instead of the longer times heretofore required.

SUMMARY OF THE INVENTION

Improved methods and sealing compositions for sealing subterranean zones are provided which overcome the deficiencies of the prior art and meet the needs described above. The methods are basically comprised of the steps of introducing a sealing composition into the subterranean zone comprised of a hydraulic cement, sufficient water to form a slurry and a rapidly acting thixotropy providing gelling agent comprising at least one compound selected from the group of compounds of the formula $M_a M_b (SO_4)_2 \cdot xH_2O$, wherein $M_a$ is a monovalent metal ion having an oxidation state of I, $M_b$ is a trivalent metal ion having an oxidation state of III, and x is the number of moles of water of crystallization in the range of from 0 to 24. Thereafter, the sealing composition is allowed to remain at rest in the zone whereby the sealing composition rapidly gels and then sets into a hard impermeable mass therein. The rapid gelling of the cement composition prevents it from being diluted and displaced into the zone during the time required for the cement composition to set.

The compositions of the invention are basically comprised of a hydraulic cement, sufficient water to form a slurry and a rapidly acting thixotropy providing gelling agent as described above. The sealing compositions can also include a viscosity reducing agent and one or more additives such as set retarding agents, fluid loss control agents, set accelerating agents, dispersing agents and formation conditioning agents.

It is, therefore, a general object of the present invention to provide improved methods and compositions for sealing permeable subterranean zones penetrated by well bores.

Other and further objects, features and advantages of the present invention will be readily apparent to those skilled in the art upon a reading of the description of preferred embodiments which follows.

DESCRIPTION OF PREFERRED EMBODIMENTS

As mentioned above, drilling fluid circulation is often lost during the drilling of a well bore which requires the termination of the drilling and the implementation of remedial procedures which are often of long duration and high costs. The remedial procedures have heretofore involved the placement of hardenable compositions such as cement compositions, cross-linked stiff gels and the like in the permeable lost circulation zone. However, because such compositions have heretofore required considerable time to harden or gel and are easily washed out, successful sealing of the lost circulation zone often does not take place. In addition to drilling fluid lost circulation zones, zones containing pressurized fluids can be encountered which cause gas, oil or water cross-flows that dilute and wash away sealing compositions. Also, underground blow-outs at low to high formation fluid flow rates can take place.

The present invention provides improved methods and sealing compositions for sealing permeable subterranean zones to thereby prevent the uncontrolled flow of fluids into or from the zones. When a sealing composition of this invention is placed in a subterranean zone to be sealed, the sealing composition rapidly forms a gel which prevents it from being washed out of the zone and allows the sealing composition to harden into an impermeable sealing mass therein.

The methods of this invention for sealing a permeable subterranean zone penetrated by a well bore are comprised of the steps of introducing a sealing composition into the subterranean zone which has thixotropic properties and when at rest rapidly forms a gel. Thus, the sealing composition can be pumped or displaced into the zone to be sealed by way of a well bore penetrating the zone without gelling. Once the sealing composition reaches the subterranean zone to be sealed, it is allowed to remain at rest therein whereby it rapidly gels and resists wash-out for the additional time period required for the sealing composition to set into a hard impermeable mass therein.

The sealing compositions of this invention are basically comprised of a hydraulic cement, sufficient water to form a slurry and a rapidly acting thixotropy providing gelling agent comprising at least one compound selected from the group of compounds of the formula $M_a M_b (SO_4)_2 \cdot xH_2O$, wherein $M_a$ is a monovalent metal ion having an oxidation state of I, $M_b$ is a trivalent metal ion having an oxidation state of III, and x is the number of moles of water of crystallization in the range of from 0 to 24. As mentioned, once the sealing composition is placed in the zone to be sealed and is allowed to rest, the sealing composition rapidly gels whereby it is not washed out of the zone while it sets into a hard impermeable mass.

A variety of hydraulic cements can be utilized in the sealing compositions of this invention including those comprised of calcium, aluminum, silicon, oxygen and/or sulfur which set and harden by reaction with water. Such hydraulic cements include Portland cements, pozzolana cements, gypsum cements, slag cements, silica cements and aluminous cements. Portland or the equivalent cements are generally preferred for use in accordance with the present invention. Portland cements of the types defined and described in the API Specification For Materials And Testing For Well Cements, API Specification 10, $5^{th}$ Edition, dated Jul. 1, 1990 of the American Petroleum Institute are particularly suitable. Preferred API Portland cements include Classes A, B, C, G and H with API Classes G and H being the most preferred. The hydraulic cements utilized in the present invention can also include additives such as fly ash for extending the cement composition and prehydrated bentonite for providing viscosity to the cement composition.

The water utilized in the cement compositions of this invention can be fresh water, unsaturated aqueous salt solutions including brines or seawater or saturated aqueous salt solutions. The water is generally present in the sealing compositions of this invention in an amount in the range of from about 30% to about 160% by weight of hydraulic cement in the compositions, more preferably in an amount in the range of from about 37% to about 56%.

As mentioned, the rapidly acting thixotropy providing gelling agents which are useful in this invention include at least one compound selected from the group of compounds of the formula $M_aM_b(SO_4)_2 \cdot xH_2O$, wherein $M_a$ is a monovalent metal ion having an oxidation state of I, $M_b$ is a trivalent metal ion having an oxidation state of III, and x is the number of moles of water of crystallization in the range of from 0 to 24. Examples of the monovalent metal ion Ma include, but are not limited to, sodium, potassium and ammonium. Examples of the trivalent metal $M_b$ include, but are not limited to, aluminum, titanium, chromium, manganese, iron, cobalt, gallium, indium, rhodium and iridium. Preferred such gelling agents are compounds of the above formula wherein x is 12. Examples of preferred gelling agents include, but are not limited to, aluminum potassium sulfate, aluminum sodium sulfate, ferrous ammonium sulfate, ferric ammonium sulfate, aluminum ammonium sulfate and mixtures thereof. Of these, aluminum potassium sulfate is the most preferred.

As also mentioned, when a rapidly acting thixotropy providing gelling agent of this invention is combined with hydraulic cement and water to form a sealing composition of this invention the composition has thixotropic properties, i.e., the sealing composition is a liquid when it is being pumped but quickly and completely gels when at rest. The gelling agent is preferably included in the sealing compositions of this invention in an amount in the range of from about 0.5% to about 5% by weight of the hydraulic cement in the composition, more preferably in an amount in the range of from about 1% to about 3% and most preferably about 2%.

As also mentioned above, the sealing compositions can also include a viscosity reducing agent to facilitate the pumping of the compositions into the zones to be sealed. Suitable viscosity reducing agents that can be used include sodium sulfate, potassium sulfate, sulfonated naphthalene-formaldehyde condensate, sulfonated acetone-formaldehyde condensate and sulfonated melamine-formaldehyde condensate. Of these, sodium sulfate is preferred. When utilized, the viscosity reducing agent is included in the sealing compositions of this invention in an amount in the range of from about 0.25% to about 5% by weight of the hydraulic cement in the compositions, more preferably in an amount in the range of from about 0.3% to about 3%, and most preferably about 0.5%.

As will be understood, the sealing compositions of this invention can include a variety of additives for improving or changing the properties of the compositions. Examples of such additives include, but are not limited to, set retarding agents, fluid loss control agents, set accelerating agents, dispersing agents and formation conditioning agents.

Set retarding agents are included in the cement compositions when it is necessary to extend the time in which the cement compositions can be pumped so that they will not thicken or set prior to being placed in the desired subterranean zone. Examples of set retarding agents which can be used include, but are not limited to, lignosulfonates such as calcium and sodium lignosulfonate, organic acids such as tartaric acid and gluconic acid, copolymers and others. The proper amount of set retarding agent required for particular conditions can be determined by conducting a "thickening time test" for the particular retarder and cement composition. Such tests are described in the API Specification 10 mentioned above. A particularly preferred set retarder for use in accordance with the present invention is a copolymer or copolymer salt of 2-acrylamido-2-methylpropane sulfonic acid and acrylic acid. When used, a set retarder is included in the sealing composition of this invention in an amount in the range of from about 0.1% to about 2% by weight of hydraulic cement in the composition.

Examples of fluid loss control agents which can be used include, but are not limited to, cellulose derivatives, modified polysaccharides, polyacrylamides, guar gum derivatives, 2-acrylamido-2-methylpropane sulfonic acid copolymers, polyethyleneimine and the like.

An example of a dispersing agent which can be utilized is comprised of the condensation polymer product of an aliphatic ketone, an aliphatic aldehyde and a compound which introduces acid groups into the polymer, e.g., sodium bisulfite. Such a dispersant is described in U.S. Pat. No. 4,557,763 to George et al. on Dec. 10, 1985.

Examples of set accelerating agents which can be utilized include, but are not limited to, calcium chloride, zinc formate and triethanolamine, and examples of formation conditioning agents include, but are not limited to, potassium chloride and sodium chloride.

A method of the present invention for sealing a permeable subterranean zone penetrated by a well bore to prevent the uncontrolled flow of fluids into or from the zone comprises the steps of: (a) introducing a sealing composition into the subterranean zone comprised of a hydraulic cement, sufficient water to form a slurry and a rapidly acting thixotropy providing gelling agent comprised of at least one compound selected from the group of compounds of the formula $M_aM_b(SO_4)_2 \cdot xH_2O$, wherein $M_a$ is a monovalent metal ion having an oxidation state of I, $M_b$ is a trivalent metal ion having an oxidation state of III, and x is the number of moles of water of crystallization in the range of from 0 to 24; and (b) allowing said sealing composition to remain at rest in said zone whereby said sealing composition rapidly gels and then sets into a hard impermeable mass therein.

A more preferred method of the present invention for sealing a permeable subterranean zone penetrated by a well bore to prevent the uncontrolled flow of fluids into or from the zone comprises the steps of: (a) introducing a sealing composition into the subterranean zone comprised of a hydraulic cement, sufficient water to form a slurry and at least one rapidly acting thixotropy providing gelling agent selected from the group of aluminum potassium sulfate, aluminum sodium sulfate, ferrous ammonium sulfate, ferric ammonium sulfate and aluminum ammonium sulfate; and (b) allowing said sealing composition to remain at rest in said zone whereby said sealing composition rapidly gels and then sets into a hard impermeable mass therein.

A preferred subterranean formation sealing composition of this invention is comprised of: a hydraulic cement; sufficient water to form a slurry; and a rapidly acting thixotropy providing gelling agent comprised of at least one compound selected from the group of compounds of the formula $M_aM_b(SO_4)_2 \cdot xH_2O$, wherein $M_a$ is a monovalent metal ion having an oxidation state of I, $M_b$ is a trivalent metal ion having an oxidation state of III, and x is the number of moles of water of crystallization in the range of from 0 to 24.

A more preferred subterranean formation sealing composition of this invention is comprised of: Portland cement; sufficient water to form a pumpable slurry; a rapidly acting thixotropic providing gelling agent comprised of aluminum potassium sulfate present in an amount of about 2% by weight of cement in the composition; and a viscosity reducing agent comprised of sodium sulfate present in an amount of about 0.5% by weight of cement in the composition.

In order to further illustrate the methods of the present invention, the following examples are given.

EXAMPLE 1

Test cement composition samples were prepared containing Class H Portland cement, tap water in the amount of 66.6% by weight of cement, prehydrated bentonite to provide viscosity in the amount of 1.5% by weight of cement, and a set retarder comprised of the sodium salt of purified lignosulfonate in the amount of 0.3% by weight of cement. Composition #1 additionally included 0.75% aluminum potassium sulfate by weight of cement and 0.25% of sodium sulfate by weight of cement. Composition #2 included 0.5% aluminum potassium sulfate by weight of cement and 0.5% sodium sulfate by weight of cement. Composition #3 included 0.25% aluminum potassium sulfate by weight of cement and 0.75% sodium sulfate by weight of cement. Composition #4 included 1.0% aluminum potassium sulfate by weight of cement.

Each of the four test composition samples had a density of 14.2 pounds per gallon. The samples were tested for thickening times in accordance with the above mentioned API Specification 10. The thickening times were determined at 120° F., 140° F., and 160° F. The rheologies of the samples were measured on a Fann viscometer at room temperature and at 120° F. after 20 minutes of conditioning in a consistometer. The rheologies are expressed by viscosities measured as torque values at different rotational speeds, i.e., 300, 200, 100, 60, 30, 6 and 3 rpm. The thixotropic properties of each of the test compositions were evaluated by measuring the slurry viscosities at 3 rpm at both room temperature and 120° F. after 10 seconds, after 10 minutes, and after 30 minutes of rest. The compressive strengths for each of the sample compositions were obtained utilizing an Ultrasonic Cement Analyzer. The results of the tests are given in Table I below.

TABLE I

Properties Of Test Cement Compositions

| Composition Component or Property | Cement Composition No. 1 | Cement Composition No. 2 | Cement Composition No. 3 | Cement Composition No. 4 |
|---|---|---|---|---|
| Aluminum Potassium Sulfate, % by weight of cement | 0.75 | 0.5 | 0.25 | 1.0 |
| Sodium Sulfate, % by weight of cement | 0.25 | 0.50 | 0.75 | — |
| Room Temp. Rheology[1], 300-200-100-60-30-6-3 rpm | 23(16)-20(13)-16(9)-14(8)-14(6)-11(5)-11(5) | 18-14-10-9-8-6-6 | 16-13-9-8-6-5-5 | 23-21-17-15-13-12-12 |
| 120° F. Rheology[1], 300-200-100-60-30-6-3 rpm | 45(29)-41(26)-38(22)-36(21)-35(20)-27(18)-18(13) | 8-7-5-4-4-3-3 | 9-7-5-4-4-3-3 | 46-45-41-40-35-25-19 |
| Room Temp. Viscosities[1] at 10 sec. and 10 min. | 13(9)-26(20) | 10-19 | 10-18 | 13-26 |
| 120° F. Viscosities[1] at 10 sec., | 18(12)-40(28)-170(110) | 6-19-12 | 5-9-nd[3] | 19-33-230 |

TABLE I-continued

Properties Of Test Cement Compositions

| Composition Component or Property | Cement Composition No. 1 | Cement Composition No. 2 | Cement Composition No. 3 | Cement Composition No. 4 |
|---|---|---|---|---|
| 10 min. and 30 min. | | | | |
| 120° F. Thickening Time, hr.:min | 5:10 | — | — | — |
| 140° F. Thickening Time, hr.:min. | 3:55 | — | — | — |
| 160° F. Thickening Time, hr.:min. | 3:43 | — | — | — |
| 120° F. Time to 500 psi.[2], hr.:min. | 11:10 | — | — | — |
| 120° F. 24 hr. compressive strength[2], psi. | 850 | — | — | — |
| 140° F. Time to 500 psi.[2], hr.:min. | 10:00 | — | — | — |
| 140° F. 24 hr. compressive strength[2], psi. | 900 | — | — | — |
| 160° F. Time to 500 psi.[2], hr.:min. | 9:00 | — | — | — |
| 160° F. 24 hr. compressive strength[2], psi. @ 160° F. | 990 | — | — | — |

[1]The numbers in parenthesis are for additional cement compositions wherein the aluminum potassium sulfate acid sodium sulfate were dry blended with the cement before being mixed with water.
[2]Determined using an Ultrasonic Cement Analyzer.
[3]nd means not determined.

The results presented in Table I, particularly the rheological data, show that the viscosities of the cement slurries prior to pumping, as well as their thixotropic properties after placement can be controlled by the use of sodium sulfate in combination with aluminum potassium sulfate at an optimized ratio. The slurry composition provided good strengths in 24 hours as well as a rapid rate of initial strength development. When excessive amounts of sodium sulfate were used when compared to the amount of aluminum potassium sulfate, for example Composition #4, the slurries became over dispersed resulting in settling of the particles which was corroborated by the low rheology values observed.

EXAMPLE 2

Additional test cement composition samples were prepared containing Class H Portland cement, fly ash in an amount of 79% by weight of cement, tap water in the amount of 47.16% by weight of cement and a set retarder comprised of the sodium salt of purified lignosulfonate in the amount of 0.15% by weight of cement. Composition #5 additionally included 0.93% prehydrated bentonite by weight of cement and 0.75% aluminum potassium sulfate by weight of cement. Composition #6 included 0.75% aluminum potassium sulfate by weight of cement. Composition #7 included 1.0% aluminum potassium sulfate by weight of cement. The test cement compositions were tested as described in Example 1 above and the test results are given in Table II below.

TABLE II

Properties Of Test Cement Compositions

| Composition Component or Property | Cement Composition No. 5 | Cement Composition No 6 | Cement Composition No. 7 |
|---|---|---|---|
| Bentonite, % by weight of cement | 0.93 | 0 | 0 |
| Aluminum Potassium Sulfate, % by weight of cement | 0.75 | 0.75 | 1.0 |
| Room Temp. Rheology, 300-200-100-60-30-6-3 rpm | 95-88-78-73-67-36-25 | 24-20-15-12-10-8-7 | 38-33-27-25-23-19-13 |
| 120° F. Rheology, 300-200-100-60-30-6-3 rpm | 181-169-156-148-124-71-49 | 46-40-33-29-25-16-12 | 69-62-54-50-45-22-16 |
| Room Temp. Viscosities at 10 sec. and 10 min. | 25-27 | 7-17 | 7-17 |
| 120° F. Viscosities at 10 sec., 10 min. and 30 min | 58-67-110 | 11-23-117 | 16-20-175 |
| 120° F. Thickening Time, hr.:min | — | 8:00 | 6:45 |

TABLE II-continued

Properties Of Test Cement Compositions

| Composition Component or Property | Cement Composition No. 5 | Cement Composition No 6 | Cement Composition No. 7 |
|---|---|---|---|
| 140° F. Thickening Time, hr.:min. | — | — | — |
| 160° F. Thickening Time, hr.:min. | — | 4:20 | 4:10 |
| 120° F. Time to 500 psi.[1], hr.:min. | — | 19:30 | 19:10 |
| 120° F. 24 hr. compressive strength[1], psi. | — | 610 | 620 |
| 140° F. Time to 500 psi.[1], hr.:min | — | — | — |
| 140° F. 24 hr. compressive strength[1], psi | — | — | — |
| 160° F. Time to 500 psi.[1], hr.:min. | — | 12:45 | 14:50 |
| 160° F. 24 hr. compressive strength[1], psi. | — | 1320 | 1150 |

[1]Determined using an Ultrasonic Cement Analyzer.

The results presented in Table II show that the cement/fly ash slurries containing bentonite (Composition #5) have high viscosities for all shear rates after mixing, and the gel strength development with time is not as pronounced as in the case of slurries containing only aluminum potassium sulfate. The latter slurries are less viscous immediately after mixing thus requiring less pump pressures for placement.

Upon placement, the slurries developed rapid gel development, for example as reflected in 30 min torque value at 120° F. for Composition #7. Additionally, the slurries in Compositions #6 and #7, showed lower viscosities at high shear rates, and high viscosities at lower shear rates suggesting good gel structure development in static situations.

EXAMPLE 3

Additional test composition samples were prepared as follows. Composition #8 included Class G Portland cement, 65.9% tap water by weight of cement, 0.3% of a set retarder comprised of sodium lignosulfonate by weight of cement and 1.0% aluminum potassium sulfate by weight of cement. Composition #9 included Class G Portland cement, 45% tap water by weight of cement, 0.3% of a set retarder comprised of sodium lignosulfonate by weight of cement and 1.0% aluminum potassium sulfate by weight of cement. Composition #10 included Class G Portland cement, 66.6% tap water by weight of cement, 1.5% prehydrated bentonite by weight of cement,0.3% of a set retarder comprised of sodium lignosulfonate by weight of cement and 1.0% aluminum potassium sulfate by weight of cement. Compositions #11 and #12 were prepared as Composition #10, except that they included 1.5% and 2.0% aluminum potassium sulfate by weight of cement, respectively. Composition #13 was prepared as Composition #11, except that it comprised 0.15% of sodium lignosulfonate retarder by weight of cement and a polyacrylamide having a molecular weight of about 300,000 in the amount of 0.2% by weight of cement.

All of the test composition samples had a slurry density of 14.2 pounds per gallon except for Composition #9 which had a density of 15.8 pounds per gallon. The test cement compositions were tested as described in Example 1 and the test results are given in Table III below.

TABLE III

Properties Of Test Cement Compositions

| Composition Property | Cement Composition No. | | | | | |
|---|---|---|---|---|---|---|
| | 8 | 9 | 10 | 11 | 12 | 13 |
| Density, lb/gal | 14.2 | 15.8 | 14.2 | 14.2 | 14.2 | 14.2 |
| Room Temp. Rheology, 300-200-100-60-30-6-3 rpm | 16-13-9-8-7-5-5 | 46-37-27-24-20-17-16 | 27-22-17-15-14-13-12 | 30-25-20-18-17-15-15 | 31-27-23-22-21-19-15 | 55-53-49-46-43-23-19 |
| 120° F. Rheology, 300-200-100-60-30-6-3 rpm | 24-20-16-14-12-10-9 | 67-57-47-43-39-26-16 | 43-38-34-31-30-26-16 | 67-60-53-50-48-28-21 | 94-86-77-73-68-30-22 | 164-142-130-121-116-24-17 |
| Room Temp. Viscosities at 10 sec. and 10 min. | 5-11 | 14-22 | 15-21 | 15-25 | 16-42 | 18-40 |
| 120° F. Viscosities at 10 sec., 10 min. and 30 min. | 9-17-96 | 19-25-140 | 16-29-134 | 20-63-270 | 22-100-300 | 18-77-330 |
| 120° F. Thickening Time, hr.:min. | — | — | — | — | 2:35 | — |
| 140° F. Thickening Time, hr.:min. | — | — | — | — | 1:10 | — |
| 160° F. Thickening Time, | — | — | — | — | 10:10 | — |

TABLE III-continued

Properties Of Test Cement Compositions

| Composition Property | Cement Composition No. | | | | | |
|---|---|---|---|---|---|---|
| | 8 | 9 | 10 | 11 | 12 | 13 |
| hr.:min. 120° F. | — | — | — | — | 10:10 | — |
| Time to 500 psi.[1], hr.:min. 120° F. | — | — | — | — | 880 | — |
| 24 hr. compressive strength[1], psi. 140° F. | — | — | — | — | 9:30 | — |
| Time to 500 psi.[1], hr.:min. 140° F. | — | — | — | — | 800 | — |
| 24 hr. compressive strength[1], psi. 160° F. | — | — | — | — | 7:30 | — |
| Time to 500 psi.[1], hr.:min. 160° F. | — | — | — | — | 870 | — |
| 24 hr. compressive strength[1], psi. | | | | | | |

[1] Determined using an Ultrasonic Cement Analyzer.

The results in Table III show that addition of bentonite to the cement slurry (Composition #10) increases the viscosity of the slurry compared to Composition #8 as well as the gel structure development under static conditions. However, the addition of increased levels of the gelling agent as in Compositions #11 and #12, the static gel structure development was significantly better as seen by the improvement in rheology under static conditions at 120° F. Addition of viscosifying polymer polyacrylamide (Composition #13) improved the rheology under dynamic conditions, for example at higher shear rates, but no significant improvement in thixotropic properties under static conditions took place.

It is believed that in the basic (relatively high pH) cement compositions of this invention, the amide groups in the polyacrylamide hydrolyze to generate anionic carboxylate groups which react with the rapidly acting thixotropy providing agents in the cement compositions to form cross-linked polymer networks that increase the viscosity of the cement compositions. Analogously, any polymer that generates anionic carboxylate groups in the cement compositions of this invention will provide enhanced thixotropic properties at down hole temperatures when included in the cement compositions.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of sealing a permeable subterranean zone penetrated by a well bore to prevent the uncontrolled flow of fluids into or from the zone comprising the steps of:
    (a) introducing a sealing composition into said subterranean zone comprised of a hydraulic cement selected from the group consisting of Portland cements, pozzolana cements, gypsum cements, slag cements and silica cements, sufficient water to form a slurry and a rapidly acting thixotropy providing gelling agent selected from the group consisting of compounds of the formula $M_aM_b(SO_4)_2 \cdot xH_2O$, wherein
    $M_a$ is a monovalent metal ion having an oxidation state of I,
    $M_b$ is a trivalent metal ion having an oxidation state of III, and
    x is the number of moles of water of crystallization in the range of from 0 to 24, and
    (b) allowing said sealing composition to remain at rest in said zone whereby said sealing composition rapidly gels and then sets into a hard impermeable mass therein.

2. The method of claim 1 wherein said water in said sealing composition is selected from the group consisting of fresh water, unsaturated aqueous salt solutions and saturated aqueous salt solutions.

3. The method of claim 1 wherein said water is present in said sealing composition in an amount in the range of from about 37% to about 56% by weight of said hydraulic cement therein.

4. The method of claim 1 wherein x is 12.

5. The method of claim 1 wherein said gelling agent is selected from the group consisting of aluminum potassium sulfate, aluminum sodium sulfate, ferrous ammonium sulfate, ferric ammonium sulfate, aluminum ammonium sulfate and mixtures thereof.

6. The method of claim 1 wherein said gelling agent is present in said sealing composition in an amount in the range of from about 0.5% to about 5% by weight of said hydraulic cement therein.

7. The method of claim 1 wherein said sealing composition further comprises one or more additives selected from the group consisting of set retarding agents, fluid loss control agents, set accelerating agents, dispersing agents and formation conditioning agents.

8. A method of sealing a permeable subterranean zone penetrated by a well bore to prevent the uncontrolled flow of fluids into or from the zone comprising the steps of:

(a) introducing a sealing composition into said subterranean zone comprising Portland cement, sufficient water to form a slurry, and a rapidly acting thixotropy providing gelling agent selected from the group consisting of compounds of the formula $M_aM_b(SO_4)_2 \cdot xH_2O$, wherein $M_a$ is a monovalent metal ion having an oxidation state of I, $M_b$ is a trivalent metal ion having an oxidation state of III, and x is the number of moles of water of crystallization in the range of from 0 to 24, and (b) allowing said sealing composition to remain at rest in said zone whereby said sealing composition rapidly gels and then sets into a hard impermeable mass therein.

9. A method of sealing a permeable subterranean zone penetrated by a well bore to prevent the uncontrolled flow of fluids into or from the zone comprising the steps of:

(a) introducing a sealing composition into said subterranean zone comprising a hydraulic cement, sufficient water to form a slurry, a rapidly acting thixotropy providing gelling agent selected from the group consisting of compounds of the formula $M_aM_b(SO_4)_2 \cdot xH_2O$, wherein $M_2$ is a monovalent metal ion having an oxidation state of I, $M_b$ is a trivalent metal ion having an oxidation state of III, and x is the number of moles of water of crystallization in the range of from 0 to 24, and a viscosity reducing agent selected from the group consisting of sodium sulfate, potassium sulfate, sulfonated naphthalene-formaldehyde condensate, sulfonated acetone-formaldehyde condensate and sulfonated melamine-formaldehyde condensate, and (b) allowing said sealing composition to remain at rest in said zone whereby said sealing composition rapidly gels and then sets into a hard impermeable mass therein.

10. The method of claim 9 wherein said viscosity reducing agent is sodium sulfate.

11. The method of claim 9 wherein said viscosity reducing agent is present in said sealing composition in an amount in the range of from about 0.25% to about 5% by weight of hydraulic cement therein.

12. A method of sealing a permeable subterranean zone penetrated by a well bore to prevent the uncontrolled flow of fluids into or from the zone comprising the steps of:

(a) introducing a sealing composition into said subterranean zone comprising a hydraulic cement, sufficient water to form a slurry, and a rapidly acting thixotropy providing gelling agent selected from the group consisting of compounds of the formula $M_aM_b(SO_4)_2 \cdot xH_2O$, wherein $M_a$ is a monovalent metal ion having an oxidation state of I, $M_b$ is a trivalent metal ion having an oxidation state of III, and x is the number of moles of water of crystallization in the range of from 0 to 24, and a polymer that generates anionic carboxylate groups in said sealing composition and thereby provides enhanced thixotropic properties to said composition, and (b) allowing said sealing composition to remain at rest in said zone whereby said sealing composition rapidly gels and then sets into a hard impermeable mass therein.

13. The method of claim 12 wherein said polymer is polyacrylamide.

14. An improved subterranean formation sealing composition comprising:

Portland cement;

sufficient water to form a slurry; and a rapidly acting thixotropy providing gelling agent selected from the group consisting of compounds of the formula $M_aM_b(SO_4)_2 \cdot 12H_2O$, wherein $M_a$ is a monovalent metal ion having an oxidation state of I, and $M_b$ is a trivalent metal ion having an oxidation state of III.

15. An improved subterranean formation sealing composition comprising:

a hydraulic cement selected from the group consisting of Portland cements, pozzolana cements, gypsum cements, slag cements, and silica cements;

sufficient water to form a slurry; and a rapidly acting thixotropy providing gelling agent selected from the group consisting of compounds of the formula $M_aM_b(SO_4)_2 \cdot 12H_2O$, wherein $M_a$ is a monovalent metal ion having an oxidation state of I, and $M_b$ is a trivalent metal ion having an oxidation state of III.

16. The composition of claim 15 wherein said water is selected from the group consisting of fresh water, unsaturated aqueous salt solutions and saturated aqueous salt solutions.

17. The composition of claim 15 wherein said water is present in an amount in the range of from about 37% to about 56% by weight of said hydraulic cement in said composition.

18. The composition of claim 15 wherein said gelling agent is selected from the group consisting of aluminum potassium sulfate, aluminum sodium sulfate, ferrous ammonium sulfate, ferric ammonium sulfate, aluminum ammonium sulfate and mixtures thereof.

19. The composition of claim 15 wherein said gelling agent is present in said sealing composition in an amount in the range of from about 0.5% to about 5% by weight of said hydraulic cement therein.

20. The composition of claim 15 wherein said rapidly acting thixotropy providing gelling agent is aluminum potassium sulfate.

21. The composition of claim 15 which further comprises one or more additives selected from the group consisting of set retarding agents, fluid loss control agents, set accelerating agents, dispersing agents and formation conditioning agents.

22. An improved subterranean formation sealing composition comprising:

a hydraulic cement;

sufficient water to form a slurry;

a rapidly acting thixotropy providing gelling agent selected from the group consisting of compounds of the formula $M_aM_b(SO_4)_2 \cdot 12H_2O$, wherein $M_a$ is a monovalent metal ion having an oxidation state of I, and $M_b$ is a trivalent metal ion having an oxidation state of III; and a viscosity reducing agent selected from the group consisting of sodium sulfate, potassium sulfate, sulfonated naphthalene-formaldehyde condensate, sulfonated acetone-formaldehyde condensate and sulfonated melamine-formaldehyde condensate.

23. The composition of claim 22 wherein said viscosity reducing agent is sodium sulfate.

24. The composition of claim 22 wherein said viscosity reducing agent is present in an amount in the range of from about 0.25% to about 5% by weight of hydraulic cement in said composition.

25. An improved subterranean formation sealing composition comprising:

a hydraulic cement;

sufficient water to form a slurry;

a rapidly acting thixotropy providing gelling agent selected from the group consisting of compounds of the formula $M_a M_b (SO_4)_2 \cdot 12H_2O$, wherein $M_a$ is a monovalent metal ion having an oxidation state of I, and $M_b$ is a trivalent metal ion having an oxidation state of III; and a polymer that generates anionic carboxylate groups in said sealing composition and thereby provides enhanced thixotropic properties to said composition.

26. The composition of claim 25 wherein said polymer is polyacrylamide.

* * * * *